United States Patent
Eiler

(10) Patent No.: US 12,365,220 B2
(45) Date of Patent: Jul. 22, 2025

(54) METHOD AND CONTROL UNIT FOR OPERATING A USER INTERFACE FOR AN AIR CONDITIONING SYSTEM

(71) Applicant: BAYERISCHE MOTOREN WERKE AKTIENGESELLSCHAFT, Munich (DE)

(72) Inventor: Simone Eiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 17/797,068

(22) PCT Filed: Dec. 10, 2020

(86) PCT No.: PCT/EP2020/085464
§ 371 (c)(1),
(2) Date: Aug. 2, 2022

(87) PCT Pub. No.: WO2021/170276
PCT Pub. Date: Sep. 2, 2021

(65) Prior Publication Data
US 2023/0054367 A1    Feb. 23, 2023

(30) Foreign Application Priority Data
Feb. 26, 2020  (DE) .................. 10 2020 105 004.6

(51) Int. Cl.
*B60H 1/00* (2006.01)
(52) U.S. Cl.
CPC ..... *B60H 1/00985* (2013.01); *B60H 1/00964* (2013.01)

(58) Field of Classification Search
CPC ............ B60H 1/00985; B60H 1/00964; B60K 2360/161; B60K 35/10; B60K 35/22; B60K 35/28; B60K 35/00
See application file for complete search history.

(56) References Cited

U.S. PATENT DOCUMENTS

2014/0309806 A1* 10/2014 Ricci .................... B60R 16/037
701/1
2015/0217626 A1* 8/2015 Minami ............. B60H 1/00964
(Continued)

FOREIGN PATENT DOCUMENTS

| CN | 101086376 A | 12/2007 |
|---|---|---|
| CN | 104822549 A | 8/2015 |

(Continued)

OTHER PUBLICATIONS

International Search Report corresponding to International Patent Application No. PCT/EP2020/085464, dated Mar. 1, 2021 (3 pages).

(Continued)

*Primary Examiner* — Peter D Nolan
*Assistant Examiner* — Brittany Renee Peko
(74) *Attorney, Agent, or Firm* — Maginot, Moore & Beck LLP

(57) ABSTRACT

A control unit for an air conditioning system is designed to operate one or more actuators of the air conditioning system automatically in an automatic operating mode in order to set reference ambient conditions in a chamber. The control unit is configured to detect that an automatic change has occurred in an operating state of an actuator of the air conditioning system. The control unit is further configured to output via a user interface of the air conditioning system, information relating to the automatic change in the operating state of the actuator.

14 Claims, 1 Drawing Sheet

(56) References Cited

U.S. PATENT DOCUMENTS

| | | | |
|---|---|---|---|
| 2015/0308708 A1* | 10/2015 | Harada | ................ F24F 11/0086 |
| 2017/0113513 A1 | 4/2017 | Yanatsubo | |
| 2017/0120724 A1* | 5/2017 | Furse | ................ B60H 1/00985 |
| 2018/0001734 A1* | 1/2018 | Faust | ................ B60H 1/0064 |
| 2018/0046164 A1 | 2/2018 | Drees | |
| 2019/0277530 A1* | 9/2019 | Schwegler | ............... F24F 11/49 |
| 2021/0101446 A1* | 4/2021 | Nakanishi | .......... B60H 1/00764 |

FOREIGN PATENT DOCUMENTS

| | | | | |
|---|---|---|---|---|
| CN | 107247528 A | | 10/2017 | |
| CN | 110822637 A | | 2/2020 | |
| DE | 19735317 A1 | | 2/1999 | |
| DE | 19958845 A1 | | 6/2001 | |
| DE | 10116265 A1 | | 10/2002 | |
| DE | 10307976 A1 | | 9/2004 | |
| DE | 10058360 B4 | | 6/2006 | |
| DE | 102007023502 A1 | | 12/2007 | |
| DE | 102016114354 A1 | | 2/2018 | |
| DE | 102017004997 A1 | | 11/2018 | |
| JP | 2004085042 A | * | 3/2004 | ............. F24F 11/02 |
| JP | 2017048962 A | * | 3/2017 | ............. F24F 11/02 |
| KR | 20200008751 A | | 1/2020 | |
| WO | 2007090593 A1 | | 8/2007 | |

OTHER PUBLICATIONS

German Search Report corresponding to German Patent Application No. 10 2020 105 004.6, dated Jan. 8, 2021 (4 pages).

English Translation of Chinese Office Action corresponding to Chinese Patent Application No. 202080094133.3, dated Jan. 24, 2025. (10 Pages).

\* cited by examiner

METHOD AND CONTROL UNIT FOR OPERATING A USER INTERFACE FOR AN AIR CONDITIONING SYSTEM

The present application is the U.S. national phase of PCT Application PCT/EP2020/085464 filed on Dec. 10, 2020, which claims priority of German patent application No. 102020105004.6 filed on Feb. 26, 2020, which is incorporated herein by reference in its entirety.

TECHNICAL FIELD

The disclosure relates to a method and to a corresponding control unit for providing and/or operating a user interface for an air conditioning system of a vehicle.

BACKGROUND

A vehicle typically has an air conditioning system, which is designed to set the ambient conditions in the interior of the vehicle. The air conditioning system can comprise various components, in particular actuators, which can influence the interior ambient conditions. Examples of components are one or more fans at different locations in the interior, one or more heating units for adjusting the temperature of the air being blown into the interior, a compressor, which can be used to cool the air, etc.

The air conditioning system can be operated automatically, or in an automatic operating mode, in order to set the ambient conditions in the vehicle interior automatically. A control unit of the air conditioning system can then operate the one or more components of the air conditioning system automatically, according to sensor data, in order to set the ambient conditions in the interior to reference ambient conditions (e.g. to a reference temperature and/or to a reference humidity).

The automatic operation of one or more components, in particular the automatic adjustment of the operating state of one or more components, of an air conditioning system may be perceived as annoying and/or confusing by an occupant of the vehicle. The present document addresses the technical problem of increasing the comfort of an occupant of a chamber, in particular of the interior of a vehicle, during automatic operation of an air conditioning system.

SUMMARY

The problem is solved by at least some of the embodiments described herein. It is pointed out that additional features of an embodiment can provide other advantages independent of features or advantages of other embodiments. This applies to technical teaching that is described in the description and can form other embodiments.

According to one aspect, a control unit for an air conditioning system is described. The air conditioning system is designed to operate one or more actuators of the air conditioning system automatically in an automatic operating mode. The air conditioning system can be used, for example, to air-condition the interior of a (motor) vehicle. Examples of actuators of the air conditioning system are: a heating unit of the air conditioning system, which heating unit is designed to increase the temperature of the air produced by the air conditioning system in the chamber to be air-conditioned; a compressor and/or evaporator of the air-conditioning system, which are designed to reduce the temperature and/or the humidity of the air; and/or one or more fans, which are designed to produce an airflow into the chamber to be air-conditioned.

During the automatic operating mode, the one or more actuators can be operated according to sensor data from one or more sensors in order to set particular reference ambient conditions automatically in the chamber to be air-conditioned. Said sensor data may indicate the temperature and/or the air humidity in the chamber to be air-conditioned. Alternatively or additionally, the sensor data may indicate whether condensate can form and/or has formed on a window, in particular on the inside of a window, of the chamber to be air-conditioned.

The control unit is configured to detect that an operating state of at least one actuator of the air conditioning system was changed automatically (as part of the automatic operating mode of the air conditioning system). For example, it can be recognized that an actuator was activated or deactivated, and/or that the intensity and/or the operating level of an actuator was increased or reduced. In particular, it is possible to detect a change in the operating state of an actuator that is perceivable (e.g. audible or palpable) to an occupant of the chamber to be air-conditioned.

The automatic change in the operating state of an actuator of the air conditioning system may be confusing and/or unpleasant and/or annoying to an occupant of the chamber to be air-conditioned. This can adversely affect the comfort of the occupant.

The control unit is configured to output, in particular indicate, via a user interface (in particular via a screen) of the air conditioning system, information relating to the automatic change in the operating state of the actuator. Said information may comprise information about which actuator of the air conditioning system automatically changed the operating state. Alternatively or additionally, the information may comprise information relating to a reason for the automatic change in the operating state of the actuator of the air-conditioning system.

The output of information relating to an automatic change in the operating state of an actuator of the air conditioning system can increase the comfort of an occupant of the chamber to be air-conditioned.

The control unit can be configured to detect that an actuator of the air conditioning system was activated automatically (which can be found unpleasant in particular in the case of a noisy actuator). Furthermore, the control unit can be configured to determine how long the actuator is likely to be active (as part of the automatic operating mode). Information can then be output about how long the actuator is likely to be active. This can further increase the comfort of an occupant of the chamber to be air-conditioned.

As already stated above, the user interface can comprise a screen (e.g. as part of a head unit of a vehicle). The control unit can be configured to bring about an indication on the screen in order to indicate the information relating to the automatic change in the operating state of the actuator.

The indication can comprise at least one indicator (e.g. an icon or symbol displayed on the screen) for the actuator whose operating state was changed automatically. The control unit can be configured to alter the indicator (for instance in terms of the color and/or intensity) in order to indicate whether the actuator is active or inactive. Alternatively or additionally, the indicator can be altered to indicate the set operating intensity of the actuator.

Alternatively or additionally, the indication can comprise at least one detail element. The control unit can be configured to indicate, via the detail element, information, in particular text information, relating to the reason why the operating state of the actuator was changed automatically.

The indication of information relating to the automatic change in the operating state of an actuator of the air conditioning system during the automatic operating mode of the air conditioning system can further increase the comfort of the occupant of the chamber to be air-conditioned.

The indication can comprise a multiplicity of indicators for a corresponding multiplicity of components of the air-conditioning system. In particular, a graphical model of the air conditioning system can be indicated (using symbols or icons for all relevant actuators and/or sensors of the air conditioning system). The control unit can be configured to indicate by means of the multiplicity of indicators on the screen, which of the multiplicity of components of the air conditioning system are active, and which are inactive, at a particular point in time. Alternatively or additionally, the control unit can be configured to indicate by means of the multiplicity of indicators, the operating state of the individual components at a particular point in time. Hence the occupant of the chamber to be air-conditioned can be informed in a particularly precise manner about the automatic operation of the air conditioning system, thereby further increasing the comfort of the occupant.

The control unit can be configured to capture via the user interface a question by an occupant of the chamber to be air-conditioned about why the operating state of the actuator was changed automatically. The question can be recognized by voice recognition, for example. In addition, the control unit can be configured to output the information relating to the automatic change in the operating state of the actuator (only and/or only then) in response to the question by the occupant. Providing an interaction facility can further increase the comfort of the occupant.

The control unit can be configured to recognize that the air conditioning system has a manually variable setting (which has been set, for instance, by a previous occupant of the chamber to be air-conditioned) that differs from a default setting. In addition, the control unit can be configured to output in response thereto, via the user interface, information that indicates that the air conditioning system has a setting that differs from the default setting. Thus the occupant of the chamber to be air-conditioned can be notified that the air conditioning system is operating in a possibly unwanted manner. As a result, the occupant can make a change to the setting and hence further increase the comfort.

According to a further aspect, an air conditioning system (e.g. for a vehicle) is described that comprises the control unit described in this document.

According to a further aspect, a (road) motor vehicle (in particular an automobile or a truck or a bus) is described that comprises the control unit described in this document and/or the air conditioning system described in this document.

According to one aspect, a method is described for operating an air conditioning system that is designed to operate one or more actuators of the air conditioning system automatically in an automatic operating mode. The method comprises detecting that an operating state of an actuator of the air conditioning system was changed automatically (without manual intervention by a user). In addition, the method comprises outputting in response thereto via a user interface of the air conditioning system, information relating to the automatic change in the operating state of the actuator.

According to a further aspect, a software (SW) program is described. The software program can be configured to be executed on a processor (e.g. on a control module of a vehicle) and thereby to perform the method described in this document.

According to a further aspect, a storage medium is described. The storage medium can comprise a SW program that is configured to be executed on a processor and thereby to perform the method described in this document.

It should be noted that the methods, devices and systems described in this document can be used both alone and in combination with other methods, devices and systems described in this document. Furthermore, any aspects of the methods, devices and systems described in this document can be combined in a variety of ways. In particular, the features of the claims can be combined in a variety of ways.

BRIEF DESCRIPTION OF THE DRAWINGS

Embodiments are described in greater detail below with reference to embodiments, where.

DETAILED DESCRIPTION

Figure 1:
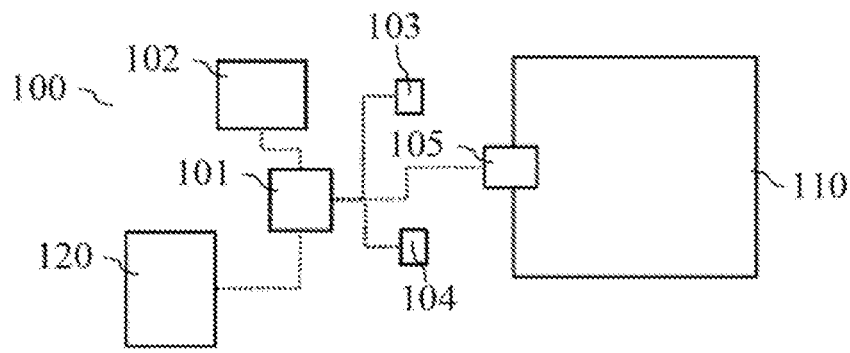
FIG. 1 shows example components of an air conditioning system of a vehicle.

As stated in the introduction, the present document is concerned with increasing the comfort from an automatic air conditioning system of a vehicle. In this connection, FIG. 1 shows example components of an air conditioning system 100. The air conditioning system 100 comprises one or more fans 105, which are designed to conduct air-conditioned air at one or more locations into the interior 110 of a vehicle. In this process, one or more parameters of the air-conditioned air can be set, for instance the temperature, the air humidity, the volume flow rate and/or the direction of flow of the air.

The air conditioning system 100 can comprise at least one air-conditioning unit 102, which is configured to set one or more parameters of the air-conditioned air. In particular, the air can be warmed by means of a heating unit. Alternatively or additionally, the air can be cooled and/or the air humidity of the air can be reduced by means of a compressor.

In addition, the air conditioning system 100 comprises one or more sensors 103, 104, which are configured to capture sensor data relating to the actual ambient conditions in the interior 110. An example of sensors 103, 104 is a temperature sensor 104, which is configured to capture sensor data (i.e. temperature data) relating to the actual temperature in the interior 110. A further example of sensors 103, 104 is a fogging sensor 103, which is configured to detect whether a window, in particular a windshield, of the interior 110 is fogged up and/or is at risk of fogging up (from the inside).

A control unit 101 of the air conditioning system 100 can be configured (in an automatic operating mode) to operate the one or more actuators 102, 105 (in particular an air conditioning unit 102 and/or a fan 105) according to the sensor data from the one or more sensors 103, 104, in particular in order to bring about particular reference ambient conditions automatically in the interior 110 of the vehicle. For example, the reference ambient conditions can comprise, or be defined by:

a particular reference temperature;
a particular reference humidity; and/or no (substantial) condensate formation on the inside of a window, in particular of a windshield, of the interior 110.

The control unit 101 can comprise one or more closed-loop controllers, which are configured to set, in particular to regulate, one or more process variables (e.g. the temperature, the moisture and/or the extent of condensate formation) to one or more corresponding reference values.

The complexity of the setting options of an air conditioning system 100 and the closed-loop and/or open-loop control thereof running in the background mean that an occupant in the interior 110 of a vehicle typically cannot follow which processes are currently taking place inside the air conditioning system 100. This can lead to dissatisfaction and/or to reduced comfort of the occupant. This can also lead to the occupant changing an operating parameter of the air conditioning system 100 manually, which can adversely affect the automatic setting for the reference ambient conditions.

The air conditioning system 100 can comprise a user interface 120, which can be used to inform the occupant of the interior 110 about which one or more actions are being carried out automatically by the air conditioning system 100. In addition, the occupant can be informed via the user interface 120 about why a specific action is being carried out by the air conditioning system 100 and/or for how long a specific action is likely to be carried out. This can increase the comfort of the occupant. Furthermore, this can reliably avoid the occupant manually intervening in the operation of the air conditioning system 100 and thereby adversely affecting the setting for the reference ambient conditions in the interior 110.

Figure 2:
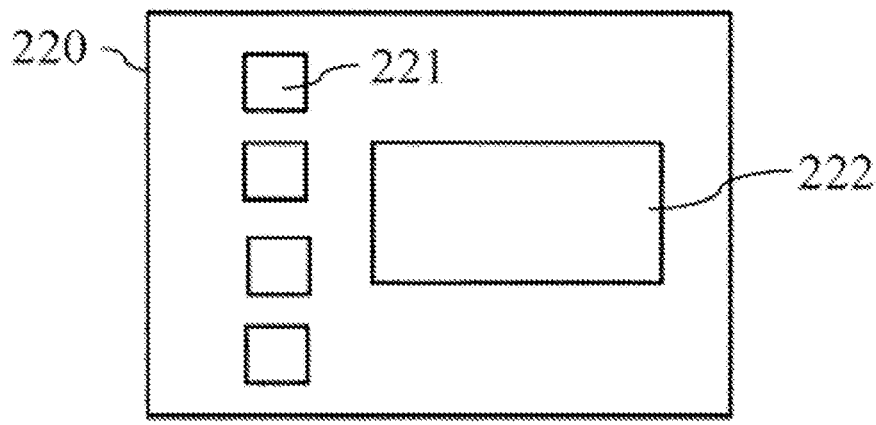
FIG. 2 shows an example output of a user interface of an air conditioning system.

FIG. 2 shows an example visual output 220, which can be output via a screen of the user interface 120. The output 220 can comprise, for example, one or more indicators 221 (e.g. icons) for one or more actuators 102, 105 of the air conditioning system 100. The indicator 221 for an actuator 102, 105 of the air conditioning system 100 can be used to indicate, for example, whether the relevant actuator 102, 105 was activated or deactivated automatically by the air conditioning system 100. Furthermore, the intensity (e.g. the level) of the operating state of the relevant actuator 102, 105 can be indicated, if applicable, by the intensity of the indicator 221.

In addition, the indication 220 can comprise one or more detail elements 222, in which is output (e.g. in text form) information relating to the operation of an actuator 102, 105 of the air conditioning system 100. For example, the reason for the operation of an actuator 102, 105 and/or the likely length of operation of an actuator 102, 105 can be indicated in a detail element 222.

Hence a user interface 120 for an automatic air conditioning system 100 can be provided, by means of which the (automatically set) air conditioning of an interior 110 can be made apparent and/or visualized for an occupant of the interior 110. For example, for this purpose, components 102, 105 of the air conditioning system 110 can be displayed visually on a screen (e.g. in the head unit of a vehicle). Individual control processes of the air conditioning system 100 resulting from anti-fogging, from solar influences, from a possible setting by the occupant, etc., can be illustrated on a screen of a user interface 120 by, for example, highlighting the individual components 102, 105 that are currently active. Furthermore, additional text information can be used to convey to the occupant further information relating to the operation of a component 102, 105.

The control unit 101 can be configured to detect an input by the occupant via the user interface 120 (e.g. a voice input and/or an input via an input menu). The indication 220 of the operating information relating to the automatic operation of the air conditioning system 100 can be brought about in response thereto (e.g. on a screen in the interior 110).

The control unit 101 can be configured to detect (for instance using voice recognition) a question by an occupant relating to the automatic operation of the air conditioning system 110. It can be recognized, for example, that the occupant is asking "Why is the blower getting louder?". The control unit 101 can thereupon bring about via the user interface 120 an output to the occupant, which informs the occupant about the cause and/or the reason for the more powerful blower 105. It can be brought about, for example, that if the air conditioning system 100 has automatically taken an anti-fogging measure, the indicator 221 for the fogging sensor 103 flashes and/or notification of the anti-fogging measure is output in the detail element 222.

The control unit 101 can be configured to display the difference between a manual and an automated air conditioning operation by graying out the one or more indicators 221 (in particular for the one or more sensors 103, 104) in the indication 220. The output of a notification (in the detail element 222) can assist the occupant in switching from the manual air conditioning operation into the automated air conditioning operation, i.e. into the automatic operating mode of the air conditioning system 100.

A particular setting for operating the air conditioning system 100 may have been made by another occupant via the user interface 120 of the air conditioning system 100 (which setting may not be apparent to a subsequent occupant). The control unit 101 can be configured to recognize that a setting for the air conditioning system 100 exists that differs from a default setting. In addition, the control unit 101 can be configured to output to the occupant a notification relating to the differing setting so that the occupant is able to change the differing setting for the air conditioning system 100.

Figure 3:
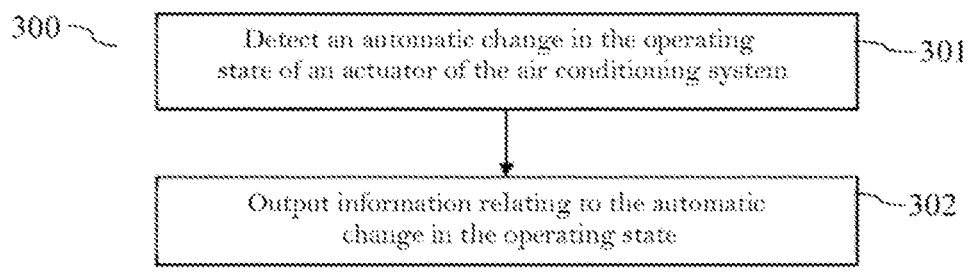
FIG. 3 shows a flow diagram of an example method for operating a user interface for an air conditioning system.

FIG. 3 shows a flow diagram of a method 300 (which may be a computer-implemented method) for operating an air conditioning system 100 that is designed to operate one or more actuators 102, 105 of the air conditioning system 100 automatically in an automatic operating mode. The method 300 can be performed by a control unit 101 of the air conditioning system 100.

The method 300 comprises detecting 301 that an operating state of an actuator 102, 105 of the air conditioning system 100 was changed automatically (as part of the automatic setting of the ambient conditions in a chamber 110). In this process, the actuator 102, 105 may have been activated or deactivated, for example, automatically (without influence by the occupant of the chamber 110). Alternatively or additionally, the intensity (e.g. an operating level) of the actuator 102, 105 may have been increased or reduced automatically (i.e. without influence by the occupant of the chamber 110).

In addition, the method 300 comprises outputting 302 in response thereto, via a user interface 120 of the air conditioning system 100 (in particular on a screen) information relating to the automatic change in the operating state of the actuator 102, 105. In this process, the occupant of the chamber 110 can be notified that the operating state was changed automatically. In addition, the occupant can be notified of the reason for the change in the operating state.

The measure described in this document can increase the comfort of an occupant of a vehicle 100 during automatic operation of an air conditioning system 100. In addition, it can be reliably avoided that an occupant adversely affects the setting for the reference ambient conditions by manual intervention in the automatic operation of the air conditioning system 100.

The present disclosure is not restricted to the embodiments shown. It should be noted in particular that the description and the figures are intended to illustrate the principle of the proposed methods, devices and systems only by way of example.

The invention claimed is:

1. A control unit for an air conditioning system that is designed to operate one or more actuators of the air conditioning system automatically in an automatic operating mode in order to set reference ambient conditions in a chamber, wherein the control unit is configured to:
   detect that an automatic change has occurred in an operating state of an actuator of the air conditioning system; and
   output via a user interface of the air conditioning system, information relating to the automatic change in the operating state of the actuator; and
   wherein the information comprises at least one of:
      information indicating a reason for the automatic change in the operating state of the actuator of the air-conditioning system; or
      information indicating a duration of time that the actuator is likely to be active; and
   wherein the control unit is further configured to:
      detect that the actuator of the air conditioning system was activated automatically;
      determine the duration of time that the actuator is likely to be active;
      output information via the user interface about the determined duration of time;
      capture via the user interface a question by an occupant of the chamber about the reason that the operating state of the actuator was changed automatically; and
      output the information relating to the automatic change in the operating state of the actuator in response to the question by the occupant.

2. The control unit as claimed in claim 1, wherein the information comprises:
   information relating to the reason for the automatic change in the operating state of the actuator of the air-conditioning system.

3. The control unit as claimed in claim 1, wherein the control unit is configured to:
   detect that the actuator of the air conditioning system was activated automatically;
   determine the duration of time that the actuator is likely to be active; and
   output information via the user interface about the determined duration of time.

4. The control unit as claimed in claim 3, wherein:
   the user interface comprises a screen; and
   the control unit is configured to cause an indication on the screen about the determined duration of time.

5. The control unit as claimed in claim 3, wherein the control unit is configured to:
   recognize that the air conditioning system has a manually variable setting that differs from a default setting; and
   output in response thereto, via the user interface, information that indicates that the air conditioning system has a setting that differs from the default setting.

6. The control unit as claimed in claim 1, wherein:
   the user interface comprises a screen; and
   the control unit is configured to cause an indication on the screen relating to the automatic change in the operating state of the actuator.

7. The control unit as claimed in claim 6, wherein:
   the indication comprises at least one indicator for the actuator; and
   the control unit is configured to alter the indicator,
      in order to indicate whether the actuator is active or inactive; and/or
      in order to indicate an intensity of operation of the actuator.

8. The control unit as claimed in claim 6, wherein:
   the indication comprises at least one detail element; and
   the control unit is configured to indicate, via the detail element, the information relating to the reason for why the operating state of the actuator was changed automatically.

9. The control unit as claimed in claim 8, wherein:
   the indication comprises a multiplicity of indicators for a corresponding multiplicity of components of the air-conditioning system; and
   the control unit is configured to
      indicate using the multiplicity of indicators a first subset of the multiplicity of components of the air conditioning system that are active, and a second subset of the multiplicity of components that are inactive at a particular point in time;
      and/or
      indicate using the multiplicity of indicators the operating state of the at least some of the multiplicity of components at a particular point in time.

10. The control unit as claimed in claim 6, wherein:
    the indication comprises at least one detail element; and
    the control unit is configured to indicate, via the detail element, text information relating to the reason for why the operating state of the actuator was changed automatically.

11. The control unit as claimed in claim 6, wherein:
    the indication comprises a multiplicity of indicators for a corresponding multiplicity of components of the air-conditioning system; and
    the control unit is configured to,
       indicate using the multiplicity of indicators a first subset of the multiplicity of components of the air conditioning system that are active, and a second subset of the multiplicity of components that are inactive at a particular point in time;
       and/or
       indicate, using the multiplicity of indicators, the operating state of the at least some of the multiplicity of components at the particular point in time.

12. A control unit for an air conditioning system that is designed to operate one or more actuators of the air conditioning system automatically in an automatic operating mode in order to set reference ambient conditions in a chamber, wherein the control unit is configured:
    to detect that an automatic change has occurred in an operating state of an actuator of the air conditioning system;
    to output via a user interface of the air conditioning system, information relating to the automatic change in the operating state of the actuator;
    to capture via the user interface a question by an occupant of the chamber about the reason that the operating state of the actuator was changed automatically; and to output the information relating to the automatic change in the operating state of the actuator in response to the question by the occupant.

13. The control unit as claimed in claim 12, wherein the control unit is configured to:
   recognize that the air conditioning system has a manually variable setting that differs from a default setting; and
   output in response thereto, via the user interface, information that indicates that the air conditioning system has a setting that differs from the default setting.

14. The control unit as claimed in claim 12, wherein the one or more actuators comprise:
   a heating unit of the air conditioning system, the heating unit configured to increase a temperature of air produced by the air conditioning system in the chamber;
   a compressor and/or an evaporator of the air-conditioning system, the compressor and/or evaporator configured to reduce the temperature and/or a humidity of the air; and/or
   at least one fan configured to produce an airflow into the chamber.

* * * * *